US012792430B2

(12) United States Patent
Koontz et al.

(10) Patent No.: US 12,792,430 B2
(45) Date of Patent: Nov. 10, 2026

(54) MESSAGE SYNCHRONIZATION SYSTEM AND METHOD WITH USER PARTITION ACCESS

(71) Applicant: THE BOEING COMPANY, Arlington, VA (US)

(72) Inventors: Ronald J. Koontz, Mesa, AZ (US); Jason Ellis Sherrill, Mesa, AZ (US); Hyunsuk Shin, Los Angeles, CA (US)

(73) Assignee: The Boeing Company, Arlington, VA (US)

( * ) Notice: Subject to any disclaimer, the term of this patent is extended or adjusted under 35 U.S.C. 154(b) by 538 days.

(21) Appl. No.: 18/185,435

(22) Filed: Mar. 17, 2023

(65) Prior Publication Data

US 2024/0311215 A1 Sep. 19, 2024

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | |
|---|---|---|---|
| 6,708,239 | B1 | 3/2004 | Ellerbrock et al. |
| 7,581,031 | B2 | 8/2009 | Konz et al. |
| 7,689,699 | B2 | 3/2010 | Chazin |
| 7,739,339 | B2 | 6/2010 | Borys et al. |
| 9,003,405 | B1 | 4/2015 | Hotra |
| 9,015,302 | B2 | 4/2015 | Howe |
| 9,438,411 | B1 | 9/2016 | Lojeck et al. |
| 9,760,094 | B2 | 9/2017 | Saad et al. |
| 9,811,455 | B2 | 11/2017 | Ellerbrock et al. |
| 10,528,077 | B2 | 1/2020 | Lee et al. |

(Continued)

FOREIGN PATENT DOCUMENTS

| | | | | | |
|---|---|---|---|---|---|
| CN | 110008041 | A | * | 7/2019 | ............. G06F 16/23 |
| CN | 112925659 | A | * | 6/2021 | ............. G06F 9/546 |
| KR | 2019-0058286 | A | * | 5/2019 | ............. G06F 11/16 |

OTHER PUBLICATIONS

Joshua R. Byrne et al., U.S. Appl. No. 63/122,976 for "Message Synchronization System", filed Dec. 9, 2020.

*Primary Examiner* — Charles E Anya
(74) *Attorney, Agent, or Firm* — Alleman Hall LLP

(57) ABSTRACT

A system and method are provided to synchronize communication between a synchronizing interface network controller (SINC) and two or more processors. Each processor defines a plurality of user partitions. Each user partition includes dedicated memory space associated with a software application executed by the respective processor. The SINC is configured to synchronously and directly push a message to one or more user partitions associated with the software applications that are being concurrently executed by the two or more processors. The one or more user partitions being executed by the two or more processors receive the same message. The one or more user partitions being executed by the two or more processors and associated with identical software applications are configured to synchronously and directly transmit a message to the SINC. The SINC receives the same message from one or more user partitions being concurrently executed by the two or more processors.

20 Claims, 4 Drawing Sheets

(56) References Cited

U.S. PATENT DOCUMENTS

| | | | | |
|---|---|---|---|---|
| 10,599,513 | B2 | 3/2020 | Lee et al. | |
| 11,132,268 | B2 | 9/2021 | Wong et al. | |
| 2002/0136205 | A1* | 9/2002 | Sasaki | H04L 49/9078 370/428 |
| 2002/0152418 | A1 | 10/2002 | Griffin et al. | |
| 2002/0188865 | A1* | 12/2002 | Joseph | H04L 9/0894 713/153 |
| 2005/0086652 | A1 | 4/2005 | Tian et al. | |
| 2007/0033511 | A1 | 2/2007 | Davies | |
| 2007/0174687 | A1 | 7/2007 | Graham et al. | |
| 2007/0271010 | A1 | 11/2007 | Kossentini | |
| 2009/0113085 | A1* | 4/2009 | Banyai | G06F 11/1441 710/53 |
| 2011/0066779 | A1 | 3/2011 | Bogenberger et al. | |
| 2011/0093838 | A1 | 4/2011 | Archambault et al. | |
| 2014/0156959 | A1* | 6/2014 | Heidelberger | G06F 5/065 711/170 |
| 2014/0281120 | A1 | 9/2014 | Ellerbrock et al. | |
| 2018/0336157 | A1 | 11/2018 | Graffy et al. | |
| 2019/0155325 | A1 | 5/2019 | Lee et al. | |
| 2019/0303224 | A1* | 10/2019 | Liu | G06F 9/546 |
| 2020/0319984 | A1 | 10/2020 | Bryant et al. | |
| 2021/0117248 | A1* | 4/2021 | Wong | G06F 9/52 |
| 2022/0179720 | A1* | 6/2022 | Byrne | G06F 9/544 |

* cited by examiner

MESSAGE SYNCHRONIZATION SYSTEM AND METHOD WITH USER PARTITION ACCESS

TECHNOLOGICAL FIELD

A system and method are provided for synchronizing communications and, more particularly, for synchronizing communications between a synchronizing interface network controller (SINC) and two or more processors that each define a plurality of user partitions.

BACKGROUND

In order to increase the availability, reliability and integrity (safety) of a system, such as a computer system, various operations may be performed in a redundant manner. For example, software applications may be operated in a redundant manner with the same software application being performed by each of two or more processors. By executing the same software application on each of two or more processors, the availability and reliability of the software application is increased.

In order to increase system integrity and therefore system safety, synchronous communication enables high integrity application messages to be compared and adjudicated. For example, one concurrently executing application may generate erroneous data due to radiation single event upset (SEU) or one application may become corrupted and thereby lose the ability to transmit one or all subsequent messages. In these cases, synchronous communication enables detection of message comparison mismatch or failure of one or more concurrent applications to transmit messages in a timely manner can be timeout detected. Overall system safety is enhanced by ensuring data integrity at the source with erroneous high integrity application messages being dropped so as not to propagate to other software applications within the system.

Redundant execution of a software application by two or more processors may be performed for various applications that demand high levels of reliability. For example, at least some of the software applications performed onboard an aircraft may be integral to the performance of the mission or to ensure continued safety of flight and, as a result, may require need to have a high degree of reliability. Thus, at least some of the software application execution onboard an aircraft may be redundantly performed by two or more processors so as to increase their reliability.

While useful for increasing the reliability of a software application, the redundant execution of a software application by two or more processors can create message input and message output inefficiencies including the consumption of additional processor and memory resources required to provide data to and read data from user partition memory, an increase in data latency caused by extra message memory copies and the imposition of various scheduling constraints. As an example of the challenges associated with the redundant execution of a software application, network switch loop back has been employed to provide the same data as input to the redundant execution of the same software application by different processors. However, network switch loop back is a relatively complex process that may introduce undesirable data latencies. As another example of the challenges, one or more additional memory devices may need to be added to the system to support the transmission of messages to and from the redundant execution of a software application with the additional memory device(s) being shared between the processors executing the same software application. The inclusion of additional memory devices not only requires additional hardware with corresponding increased power requirements, but may also require additional software to provide mutual access to the shared memory devices for the two or more processors executing the same software application.

BRIEF SUMMARY

A system and method are provided in accordance with an example embodiment to synchronize communication, such as by synchronizing communication between a synchronizing interface network controller (SINC) and a plurality of identical user partitions instantiated on two or more processors that are in communication with the SINC. By synchronizing communications in accordance with an example embodiment, the system and method may reduce data latency and may reduce scheduling constraints otherwise potentially created by the redundant execution of a software application by the two or more processors. In addition, the overall processing efficiency may be improved by the system and method of an example embodiment by reducing the instances in which data is written to and read from various memory locations, while still providing for the concurrent redundant execution of the same software application by two or more processors to improve the reliability and integrity of the software application.

In an example embodiment, a system is provided that is configured to synchronize communications. The system includes a SINC and two or more processors in communication with the SINC. Each processor defines a plurality of user partitions. Each user partition comprises dedicated memory space associated with a software application to be executed by the respective processor. The SINC is configured to synchronously and directly push a message to memory of one or more user partitions associated with the software applications that are being currently executed by the two or more processors. As such, the one or more user partitions being executed by the two or more processors receive the same message from the SINC. The one or more user partitions being executed by the two or more processors and associated with identical software applications are configured to directly transmit a message to the SINC. As such, the SINC receives the same message from one or more user partitions being concurrently executed by the two or more processors.

The SINC of an example embodiment is configured to access a plurality of message queues for storing respective messages. Each respective message queue is associated with a respective user partition. In this example embodiment, the two or more message queues associated with different user partitions may be configured to store the same message in an instance in which the different user partitions consume the same data. In an example embodiment, a number of different message queues are associated with different user partitions. The SINC of an example embodiment is further configured to determine and provide an indication that a queue associated with the respective user partition is full or has experienced an overflow condition.

The SINC of an example embodiment is configured to push the message to a respective user partition by pushing the message to one or more memory locations of the two or more processors that are dedicated to the respective user partition. In an example embodiment, the SINC is configured to concurrently push both standard integrity messages (routed to a single processor) and high integrity messages (routed to two or more processors after bit level comparison check) without prioritization of the high integrity messages. The SINC of an example embodiment can further be commanded to start and stop transmission of messages to one or more user partitions by issuing a partition level indicator. In an example embodiment, the SINC is further configured to provide a message timestamp for determining whether the message pushed to one or more user partitions is outdated. In this example embodiment, a user partition is configured to compare a reference time to a message level timestamp to determine whether a message is stale and no longer valid. In an instance in which the messages received by the SINC are of a predetermined type, such as high integrity messages, the SINC of an example embodiment is further configured to compare the same messages received from the one or more user partitions being concurrently executed by the two or more processors and drop message comparison mismatched messages to avoid erroneous data propagation, thereby transmitting the messages only if they are identical.

In another example embodiment, a method is provided for synchronizing communication between a SINC and two or more processors communicating with the SINC. Each of the two or more processors defines a plurality of user partitions with each user partition including dedicated memory space associated with a software application to be executed by a respective processor. The method includes synchronously and directly pushing a message from the SINC to memory of one or more user partitions associated with the software applications that are being concurrently executed by the two or more processors. As such, some of the one or more user partitions being executed by the two or more processors receive the same message from the SINC.

The method also includes directing transmission of a message from one or more user partitions that are executed by two or more processors and associated with identical software applications to the SINC. As such, the SINC receives the identical message from one or more user partitions that are being concurrently executed by the two or more processors.

The method of an example embodiment also includes storing respective messages in a plurality of queues maintained by the processors. Each message queue is associated with the respective user partition. The method of this example embodiment stores respective messages in the plurality of message queues by storing the same message in two or more message queues associated with different user partitions in an instance in which the different user partitions consume the same data. The method of this example embodiment also includes associating a different number of message queues with different user partitions. The method may also include determining, by the SINC, and providing an indication to the processor that a queue associated with the respective user partition is full or has experienced an overflow condition.

The method of an example embodiment pushes the message from the SINC to a respective user partition by pushing the message from the SINC to one or more memory locations of the one or more processors that are dedicated to the respective user partition. The method of an example embodiment pushes the message from the SINC by concurrently pushing both standard integrity messages and high integrity messages from the SINC without prioritization of the high integrity messages. In an example embodiment, the method also includes flushing messages or starting and stopping transmission of messages to one or more user partitions by issuing a partition level indicator to the SINC. The method of an example embodiment also includes indicating that the message pushed to one or more user partitions is outdated by comparing a reference time and a message timestamp to determine whether the message is valid or invalid (age expired).

In an instance in which messages received by the SINC are of a predetermined type, such as high integrity messages, the method of an example embodiment may also include comparing, at the SINC, the same messages received from the one or more user partitions being concurrently executed by the two or more processors and dropping any message that does not identically match or when one or more messages are not received within a pre-configured timeout period, thereby insuring that messages are only transmitted to the network by the SINC if the messages are identical.

BRIEF DESCRIPTION OF DRAWINGS

Having described certain examples of the present disclosure in general terms above, reference will now be made to the accompanying drawings, which are not necessarily drawn to scale and wherein.

DETAILED DESCRIPTION

Some examples of the present disclosure will now be described more fully hereinafter with reference to the accompanying drawings, in which some, but not all examples of the present disclosure are shown. Indeed, these examples may be embodied in many different forms and should not be construed as limited to the examples set forth herein; rather, these examples are provided so that this disclosure will satisfy applicable legal requirements. Like numbers refer to like elements throughout. As used herein, the terms “message”, “data,” “content,” “information,” and similar terms may be used interchangeably to refer to data capable of being transmitted, received, and/or stored in accordance with examples of the present disclosure. Thus, use of any such terms should not be taken to limit the spirit and scope of examples of the present disclosure.

A system and method are provided for synchronizing communications between a SINC and two or more processors and a plurality of user partitions that are in communication with the SINC. By synchronizing communications between the SINC and the two or more processors, identical software applications may be concurrently executed by the two or more processors to enhance availability, redundancy, and data integrity thereby increasing the reliability and safety of the software application and the overall system. Additionally, the concurrent execution of identical software applications by the two or more processors may be performed in accordance with an example embodiment in an efficient manner with less data latency. Indeed, messages may be transmitted directly between the SINC and user partitions instantiated on the two or more processors to facilitate the timeliness and efficiency with which the identical software applications are executed.

Figure 1:
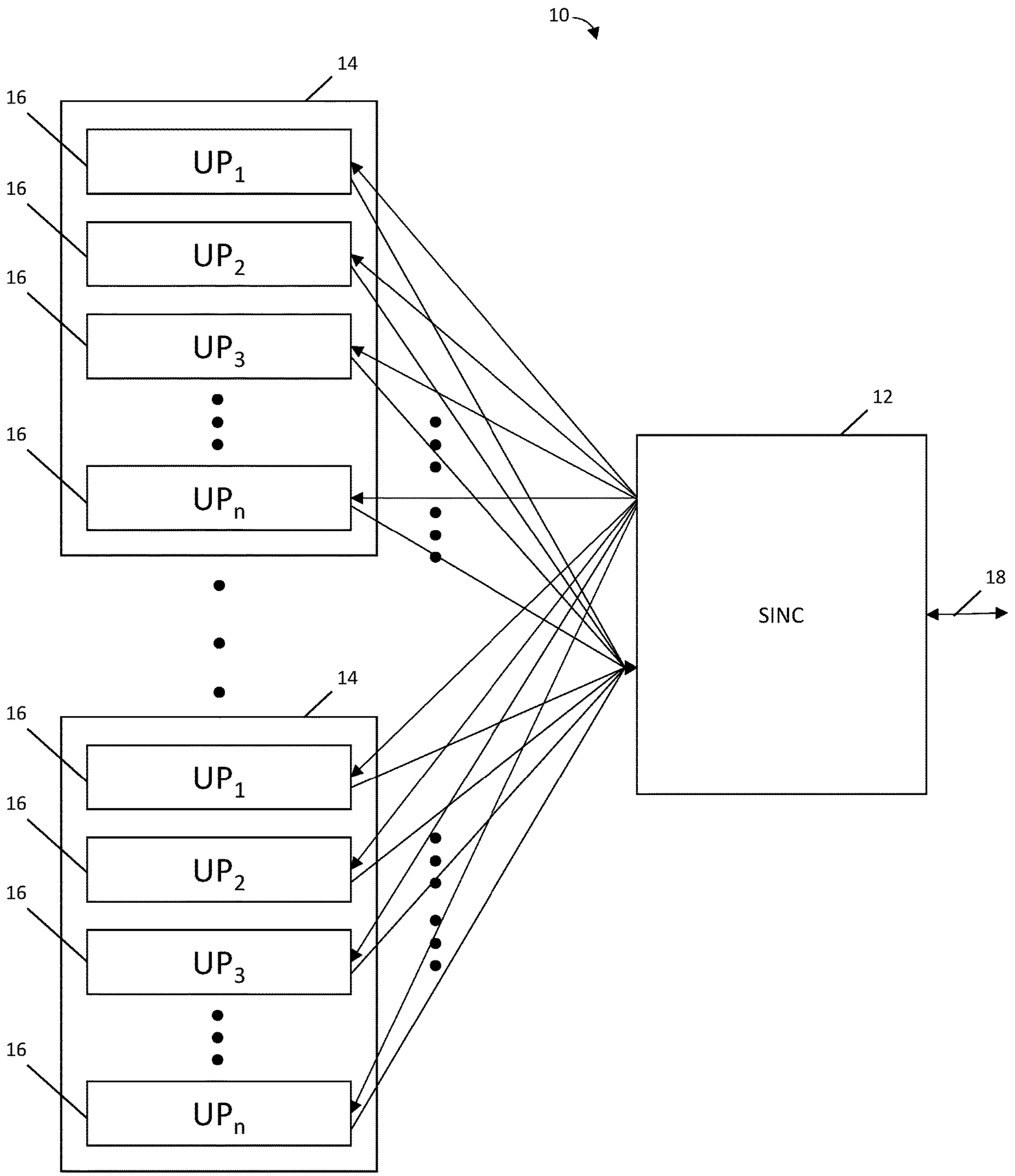
FIG. 1 is a representation of a system configured to synchronize user partition (UP) communications in accordance with an example embodiment.

Referring to FIG. 1, a system 10 in accordance with an example embodiment for synchronizing communications is depicted. The system 10 includes a SINC 12. The SINC 12 may be embodied by any of a variety of different computing devices, but in an example embodiment, is embodied by hardware, such as an application specific integrated circuit (ASIC), a field programmable gate array (FPGA), or the like. The SINC 12 is in direct communication with two or more processors 14. Although the system 10 of FIG. 1 depicts a pair of processors 14, the system may include three, four or more processors, each of which is configured to directly communicate with the SINC 12. The processors 14 may be multi-core processors, single core processors, homogenous multi-core processors, heterogenous multi-core processors, graphics processors, general-purpose processors, or any other type of computing device. In addition, all of the processors 14 that are configured to synchronously communicate with the SINC 12 may be the same type of processors or may be different (dissimilar) types of processors.

As shown in FIG. 1 and as described below, the SINC 12 is configured to communicate with a network, such as via a network bus 18. Although the SINC 12 may be configured to communicate with any of a variety of different types of networks, the SINC 12 of an example embodiment is configured to communicate with a deterministic Ethernet network, such as an Aeronautical Radio Incorporated (ARINC) 664 network. The network bus 18 is generally configured for bidirectional communication with the SINC 12. Thus, the SINC 12 is configured to receive messages from the network that, in turn, are synchronously pushed to one or more user partitions 16 of two or more processors 14, each of which defines a distinct computing lane. The user partitions 16 of the two or more processors 14 are also configured to transmit messages to the SINC 12 and the messages may, in turn, be transferred via the SINC 12 to the network bus 18. As illustrated, the two or more processors 14 and the SINC 12 are in direct communication with one another with no intervening gateway or relay or other intermediary device therebetween.

As noted above, each processor 14 defines a plurality of user partitions 16. Each user partition 16 includes memory space of the respective processor 12 with the memory space being associated with a software application to be executed by the respective processor. The memory space of a respective user partition 16 may be associated with the software application in various manners including memory space in which the software application is stored, memory space that is utilized during execution of the software application and/or memory space that serves to store results generated by execution of the software application.

Figure 2:
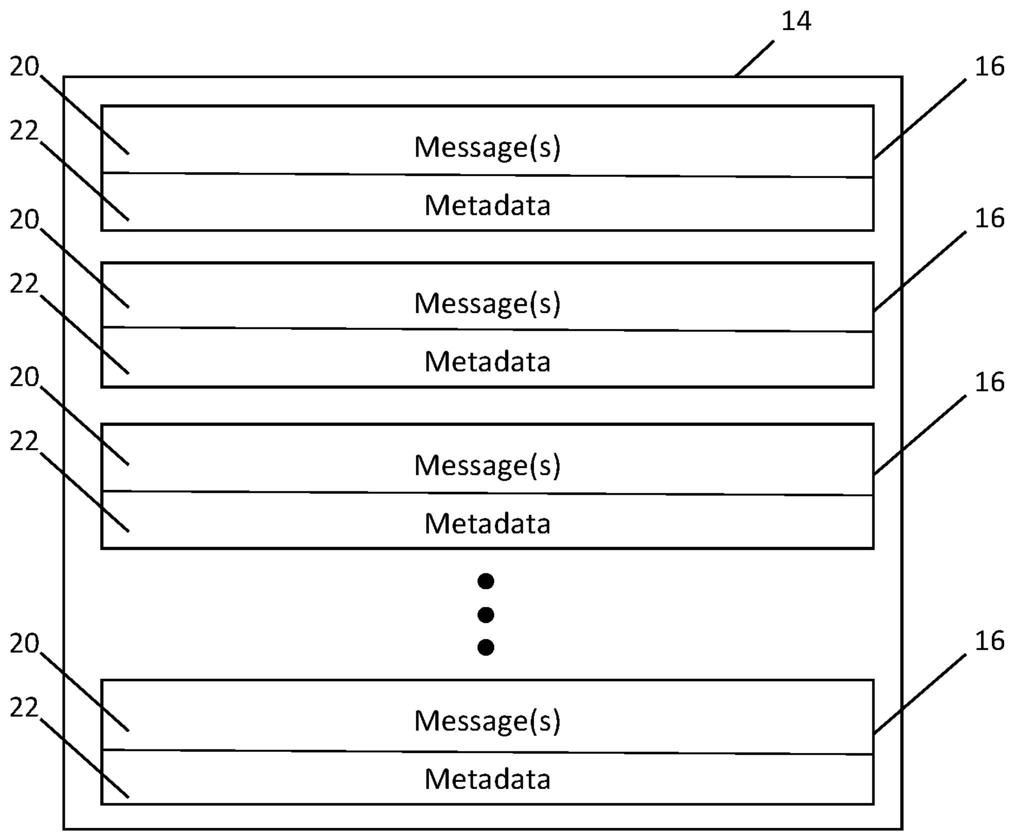
FIG. 2 is a representation of a processor memory layout of the system of FIG. 1 which includes a plurality of user partitions in accordance with an example embodiment.

As shown in FIG. 2, each user partition 16 of one example embodiment may include memory space 20 for storing messages that are received from the SINC 12 and/or transmitted to the SINC 12. In the illustrated embodiment, each user partition 16 also includes memory space 22 for storing metadata associated with the respective message. As described below, various types of metadata may be stored including queue read and write pointers, queue overflow information and a common wall clock value 35 (reference time). The common wall clock value 35 may provide the message time reference, with which messages may be time-stamped upon reception and/or transmission.

Figure 3:
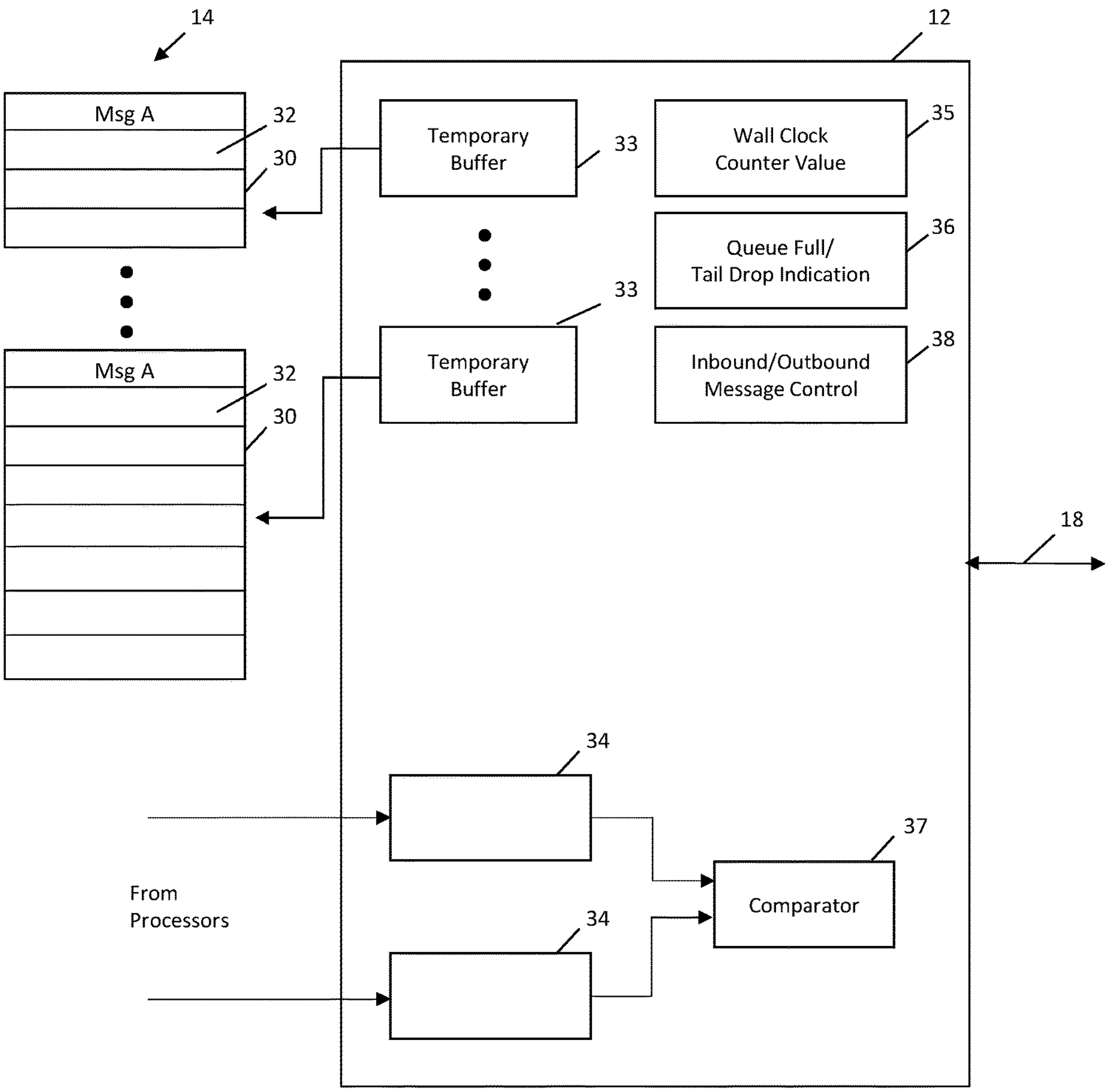
FIG. 3 is a more detailed representation of the SINC corresponding to the system of FIG. 1 in accordance with an example embodiment.

As introduced by FIG. 2 and as shown in FIG. 3 and described below, the memory space 20 of each user partition 16 for each of the two or more processors 14 may be embodied in one embodiment by a queue 32 into which messages received via the network 18 for the respective user partition may be pushed by the SINC 12. The messages stored in the queue 32 of a user partition 16 include those messages to be provided to the software application associated with a respective user partition, such as represented by the message designated MsgA in FIG. 3. The queues 32 maintained by the processors 14 may be configurable so as to support different user partitions executing at different times within a periodic epoch and specific to a given processor instantiation.

Figure 4:
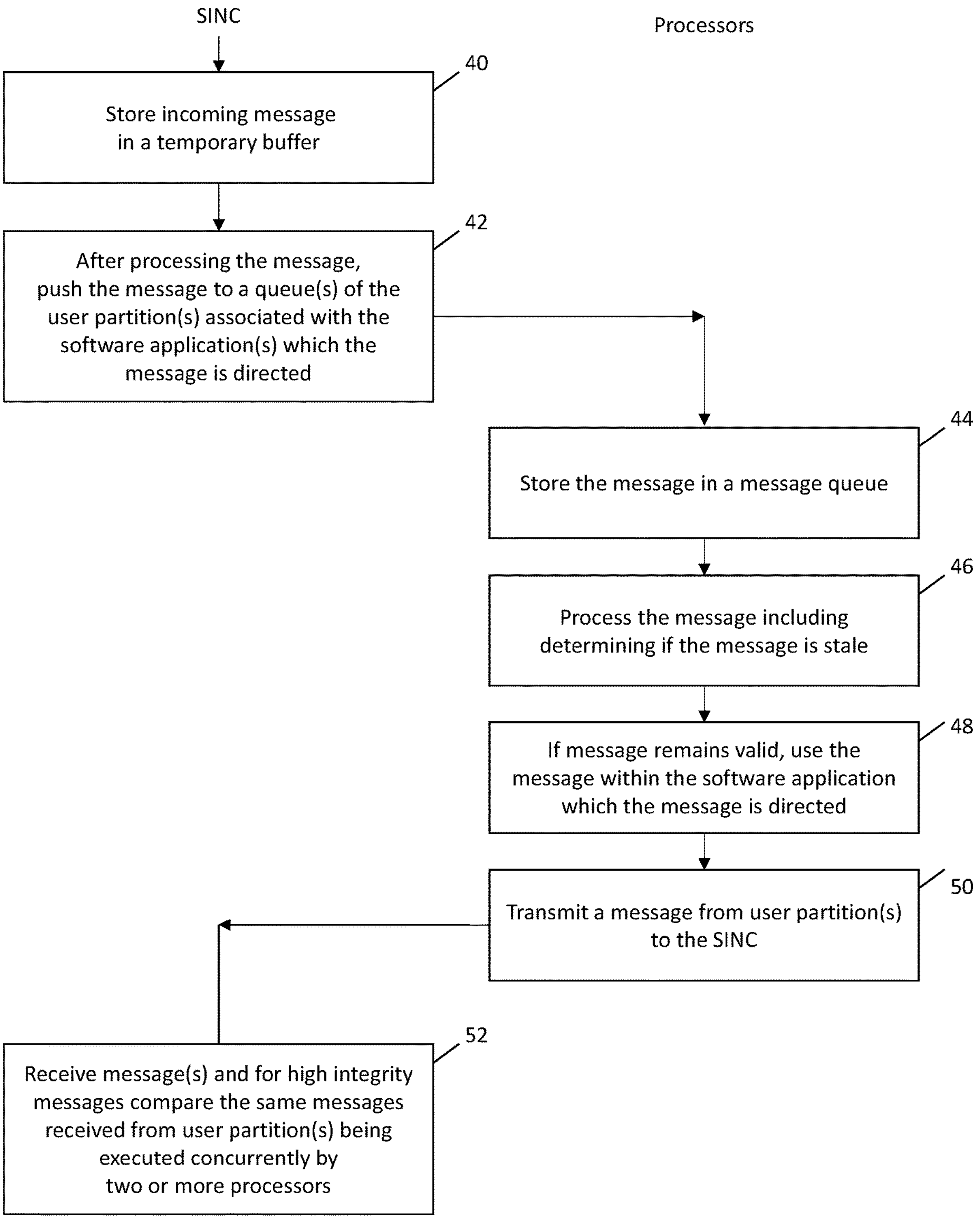
FIG. 4 is a flowchart illustrating operations performed, such as by the system of FIG. 1, in accordance with an example embodiment of the present disclosure.

In this regard and also shown in block 40 of FIG. 4, an incoming message from the network 18 may be stored by the SINC 12 in a temporary buffer 33 of the SINC as depicted by FIG. 3, one of which is associated with each computing lane. Upon receipt and storage in the temporary buffer 33, the SINC 12 processes the message, such as by performing network protocol processing and internal message lane comparisons prior to synchronously pushing the message to one or more user partition 16 memory of the computing lane with which the temporary buffer 33 is associated and, more particularly, to the queues 32 associated with the user partitions 16 that are associated with the software application to which the message is directed. See block 42. The index of a queue 32 in which a message is stored may be identified by a write pointer. The write pointer may be updated by the SINC, such as by being incremented, and the write pointer associated with a message may be stored in the metadata associated with the message. In an instance as shown in FIG. 3 in which the same message, e.g., MsgA, is to be pushed to the queues 32 associated with the user partitions of two or more processors 14, such as in an instance in which the same software application is concurrently executed by the two or more processors, the internal lane comparisons performed by the SINC 12 of an example embodiment may include a bit by bit comparison of the message contents within the temporary buffers 33 associated with the different computing lanes to ensure that the messages are, in fact, identical (have not been corrupted by a radiation Single Event Upset (SEU)) prior to pushing the same messages to the user partitions 14.

The message queues 32 accessed by the SINC 12 that are associated with user partition 16 instances may vary in depth from one processor 14 to another. As shown in FIG. 3, for example, the size of the message queue 32 accessed by the SINC 12 in association with a first user partition 16 may be larger than the message queue associated with a second user partition, such as an instance in which the software application executed by the first user partition is anticipated to receive more messages or to receive messages more frequently than the software application executed by the second user partition.

Messages that are pushed by the SINC 12 and stored by a queue 32 may be read by the processor 14 that supports the user partition 16 with which the queue is associated such that the message may be processed by the software application to which the message is directed. See blocks 44 and 48 of FIG. 4. The message that is read by the processor 14 may be identified based upon a read pointer stored by the metadata 22 of the user partition or otherwise maintained by the respective processor. Following reading of a message, the read pointer may be updated by the processor 14, such as by being incremented.

The software application associated with a respective user partition 16 may also write outbound messages to the SINC 12, in particular, to the memory space 34, such as to a buffer within the SINC 12 associated with the respective user partition. See block 50 of FIG. 4. The buffer to which the message is written may be identified based upon pre-configuration of the memory space starting address for the respective user partition 16. The SINC 12 then processes the message written into the message space 34 for the respective user partition 16 prior to another message being written to the same message space by the same user partition. The SINC 12 may then be configured to transmit the message that has been written by a user partition 16 to the buffer of the SINC 12 via the network bus 18.

Although the messages may be written from a user partition 16 to a predefined memory space 34 of the SINC 12, the system 10 and method of another alternative embodiment may include a SINC 12 having memory queues into which the messages from respective computing lanes are pushed. The messages may then be read by the SINC 12 from the queues for processing and/or transmission via the network 18. In this embodiment, a write pointer may be maintained by the processors 14 to identify the location within the queue into which a message is to be written and a read pointer may be maintained by the SINC 12 to identify the location from which the SINC 12 reads a message.

In an example embodiment, a system 10 for synchronizing communications between a SINC 12 and two or more processors 14 in communication with the SINC 12 may be configured to synchronously and directly push a message from the SINC 12 to one or more user partitions 16 associated with the software applications that are concurrently executed by the two or more processors. By pushing the same message from the SINC 12 to user partition(s) 16 associated with a software application that is being concurrently executed by two or more processors 14, the same message may be received and processed by the user partition(s) of the two or more processors. As such, concurrent execution of the same software application based upon the same input messages provided by the SINC 12 is supported, thereby enabling the generation of identical software application output messages.

In relation to the SINC 12 pushing a message to a respective user partition 16, the SINC 12 of an example embodiment is configured to push the message from the SINC 12 to memory queue(s) 32 of the one or more processors 14 that are dedicated to the respective user partition 16. The memory queue(s) 32 are within the memory space 20 associated with the software application being executed by the respective processor 14. The SINC 12 may be configured to push the message in the same manner regardless of the relative integrity of the message. For example, the SINC 12 may be configured for standard integrity messages (routed to a single processor) to be pushed to a user partition 16 of a single processor 14 and for high integrity messages (routed to two or more processors following a bit level comparison check) to be pushed to two or more user partitions 16 associated with software applications being concurrently executed by two or more processors 14 without prior execution of the high integrity messages.

As noted above, upon receipt and storage in the temporary buffer 33, the SINC 12 of an example embodiment performs network protocol processing and internal lane message comparisons prior to pushing the message to the respective user partition 16 of the respective processor 14 and, more particularly, to the message queue 32 associated with the respective user partition 16 of the respective processor 14. To support concurrent and synchronous execution of the same software application by a user partition 16 of each of two or more processors 14, the SINC 12 of an example embodiment is configured to store the same message in two or more temporary buffers 33 and, in turn, to push the same message to the message queues 32 associated with different user partitions, such as user partitions of different processors, in an instance in which the different user partitions consume the same data, such as an instance in which the different user partitions each execute the same software application. See, for example, the message designated MsgA stored in two different message queues 32 associated with two different user partitions 16 in FIG. 3.

In some instances, the queue 32 associated with a user partition 16 and accessed by the SINC 12 may become full, such as in an instance in which a message is stored in each index of the queue or may experience an overflow condition in which one or more indexes of the queue are overwritten or new messages are dropped prior to the old messages being read into memory 20 by the user partition 16. In this instance, the SINC 12 is configured to provide an indication to the user partition 16 that the queue 32 is full or that the queue has experienced an overflow condition. The SINC 12 may be configured to identify that the queue 32 is full or that the queue has experienced an overflow condition in various manners, but, in one embodiment, identifies that the queue is full or has experienced an overflow condition based upon a comparison of the read and write pointers. By way of example with respect to a queue 32 in the form of a circular buffer, the SINC 12 may be configured to identify that the queue is full in an instance in which the write buffer has a value that is 1 less than the read buffer. This indication may also be stored, at least temporarily by the SINC 12, as a Queue Full/Tail Drop Indication 36 and, in some embodiments by the metadata 22 of the user partition 16. In the instance in which the indication is that the queue is full, the user partition 16 may flush the queue or more quickly read one or more messages from the queue 32 to reduce the likelihood of another overflow condition occurring. However, in an instance in which an overflow condition has occurred, the user partition 16 is informed such that the user partition can either take remedial action and request retransmission of the messages that were dropped or at least proceed with knowledge that the one or more messages were lost.

As shown in FIG. 4, a message may also be transmitted to the SINC 12 from one or more user partitions 16 that are executed by two or more processors 14 and that are associated with the identical software application running on other processors 14. See block 50 of FIG. 4. Thus, the SINC 12 receives the same message from one or more user partitions 16 that are being concurrently executed by the two or more processors 14. See block 52 of FIG. 4. As noted above, the SINC 12 of an example embodiment includes a buffer 34 associated with each user partition 16 for storing the message provided by the user partition prior to, for example, comparison and transmission of the message via the network bus 18. Instead of transmitting the message via the network bus 18, the SINC 12 of an example embodiment may be configured to transmit the message to another application executed by the same or a different one of the plurality of processors 14. Still further, the message may be transmitted by the SINC 12 via the network bus 18 in order to be looped back by a network switch. By transmitting the same message from one or more user partitions 16 being concurrently executed by two or more processors 14, the concurrent and redundant execution of the same software application is supported and data integrity at the source is preserved.

FIG. 4 depicts both inbound message processing in which messages are received by the SINC 12 and pushed to one or more processors 16 as represented by blocks 40-44 and outbound message processing in which messages are provided by the one or more processors and one or more user partitions to the SINC for further processing and/or transmission as represented by blocks 50 and 52. The inbound and outbound message processing may occur sequentially. Alternatively, the inbound and outbound message processing may occur concurrently with one message being subjected to inbound processing while another message is concurrently subjected to outbound processing.

In an example embodiment and in an instance in which the messages received by the SINC 12 are of a predetermined type, such as a high integrity message, the SINC 12 may be configured to compare the same messages received from the one or more user partitions 16 that are being executed by the two or more processors 14. These operations may occur even in an instance where the application being concurrently executed by two or more processors is not running synchronously in each processor as a result of buffering the incoming messages. For example the SINC 12 may include a comparator 37 as shown in the embodiment of FIG. 3. Only in an instance in which the comparison of the messages indicates that the messages are identical, transmission of the messages via the network may continue. However, in an instance in which the messages that are compared and determined to be different, the SINC 12 may be configured to drop the erroneous message and provide an indication to the user partitions 16 that a message comparison mismatch has occurred. In an example embodiment, high integrity messages, e.g., messages received from two or more processors 14, are compared as described above, while standard integrity messages received from a single processor may bypass the message comparison.

A SINC 12 of an example embodiment is also configured to provide a timestamp within each message metadata that is pushed to one or more user partitions 16. The timestamp may be based upon the reference time as defined by the wall clock counter value 35 that is maintained by the SINC 12. Additionally, the reference time as also defined by the wall clock counter value 35 may be latched by the processor 14 on a repeated basis, such as once per start of periodic epoch. The reference time may also be stored in the metadata of one or more user partitions. This information enables the user partition 16 of processor 14 to process a message, such as to determine message staleness. See block 46 of FIG. 4. For example, each user partition 16 of this embodiment may be configured to compare the reference time to the timestamp of a message and to indicate that the message is stale if the elapsed time from the reference time to the time defined in the timestamp of the message exceeds a predefined value. Otherwise, if the elapsed time from the reference time to the time defined in the timestamp of the message is less than the predefined value, the message is considered valid and subject to further processing. In an instance in which the same message is to be provided to multiple user partitions 16, the exact same timestamp 35 may be provided to the multiple user partitions. For example, a message received via the network and stored in a message queue 32 for more than a predetermined period of time may be determined by user partition software to be outdated. Alternatively, a message that is received by the SINC 12 and stored in the message queue 32 may include an indication as to the time period for which the message is valid or the time at which the message expires. Thus, a user partition 16 of a processor 14 of this example embodiment may be configured to determine that the message is stale following expiration of the time period or following the expiration time of a respective message. As such, the user partition 16, upon determination that a message is stale, based upon a comparison of the reference time and the timestamp of the message, may take remedial action, such as dropping the message or restarting the application.

As indicated in FIG. 3, the SINC 12 of an example embodiment may be commanded by user partition 14 software to start or stop inbound/outbound message transmission control 38. This message control 38 is provided to the SINC 12 to flush message buffers and start and stop inbound and outbound message transmission. This message control 38 may be a partition level indicator so as to provide user partition 14 level message control.

As described above, a system 10 and method are provided in accordance with an example embodiment in order to synchronize user partition communication, such as by synchronizing communication between a SINC 12 and two or more processors 14 that are in communication with the SINC 12. By synchronizing communications in accordance with an example embodiment, the system 10 and method may reduce data latency and may reduce scheduling constraints otherwise potentially created by the redundant execution of a software application by the two or more processors 14. In addition, the overall processing efficiency may be improved by the system 10 and method of an example embodiment by reducing the instances in which data is written to and read from various memory locations, while still providing for the concurrent redundant execution of the same software application by two or more processors 14 in order to improve the reliability of the software application and high integrity data transmission.

FIG. 4 is a flowchart describing the operation of systems, methods, and computer program products according to the disclosure. It is understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowchart, and combinations of blocks in the flowchart, can be implemented by special purpose hardware-based computer systems which perform the specified functions, or combinations of special purpose hardware and software instructions.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

What is claimed is:

1. A system configured to synchronize communications, the system comprising:

a synchronizing interface network controller (SINC); and two or more processors in communication with the SINC, wherein each processor defines a plurality of user partitions, and wherein each user partition comprises dedicated memory space including a queue associated with a software application to be executed by a respective processor, wherein the SINC is configured to synchronously and directly push a message to the queue of one or more user partitions associated with the software applications that are being concurrently executed by the two or more processors, wherein the one or more user partitions being executed by the two or more processors receive the same message from the SINC, wherein the one or more user partitions being executed by the two or more processors and being associated with identical software applications are configured to directly transmit a message to the SINC, and wherein the SINC receives the same message from the one or more user partitions being concurrently executed by the two or more processors, and wherein, in an instance in which the messages received by the SINC are of a predetermined type, the SINC is further configured to compare the messages received from the one or more user partitions being concurrently executed by the two or more processors and only transmit the messages if the messages are identical.

2. A system according to claim 1, wherein two or more message queues associated with different user partitions are configured to store the same message in an instance in which the different user partitions consume the same data.

3. A system according to claim 1, wherein a different number of message queues are associated with different user partitions.

4. A system according to claim 1, wherein the SINC is further configured to provide an indication that a queue associated with a respective user partition of the plurality of user partitions is full or has experienced an overflow condition to the respective user partition.

5. A system according to claim 1, wherein the SINC is configured to push the message to a respective user partition by pushing the message to one or more memory locations of the two or more processors that are dedicated to the respective user partition.

6. A system according to claim 1, wherein the SINC is configured to concurrently push both standard integrity messages and high integrity messages without prioritization of the high integrity messages.

7. A system according to claim 1, wherein the SINC is commanded to flush messages or start and stop transmission of messages to the one or more user partitions by receiving a partition level command.

8. A system according to claim 1, wherein a user partition is further configured to indicate that the message pushed by the SINC to the one or more user partitions is outdated based upon a comparison of a reference time and a timestamp associated with the message.

9. A system according to claim 1, wherein the SINC is configured to identify an overflow condition in which the queue is full and the message is dropped, based on identifying the overflow condition, take remedial action to resolve the overflow condition of the queue, send a request to the one or more user partitions to directly retransmit the message to the SINC, and directly push the retransmitted message to the queue.

10. A system according to claim 9, wherein the remedial action to resolve the overflow condition of the queue includes at least one of flushing the queue or performing read operations to remove one or more message from the queue.

11. A system according to claim 1, wherein the SINC is configured to access a plurality of processor message queues for storing respective messages, wherein each message queue is associated with a respective user partition.

12. A method for synchronizing communications between a synchronizing interface network controller (SINC) and two or more processors in communication with the SINC, wherein each of the two or more processors defines a plurality of user partitions with each user partition comprising dedicated memory space including a queue associated with a software application to be executed by a respective processor, the method comprising:

synchronously and directly pushing a message from the SINC to the queue of one or more user partitions associated with the software applications that are being concurrently executed by the two or more processors, wherein the one or more user partitions being executed by the two or more processors receive the same message from the SINC;

directing transmission of a message from the one or more user partitions being executed by the two or more processors and being associated with identical software applications to the SINC, wherein the SINC receives the same message from the one or more user partitions being concurrently executed by the two or more processors; and in an instance in which the messages received by the SINC are of a predetermined type, comparing, at the SINC, the messages received from the one or more user partitions being concurrently executed by the two or more processors and only transmitting the messages if the messages are identical.

13. A method according to claim 12, further comprising storing the same message in two or more message queues associated with different user partitions in an instance in which the different user partitions consume the same data.

14. A method according to claim 12, further comprising associating a different number of message queues with different user partitions.

15. A method according to claim 12, further comprising providing an indication that a queue associated with a respective user partition of the plurality of user partitions is full or has experienced an overflow condition to the respective user partition.

16. A method according to claim 12, wherein pushing the message from the SINC to a respective user partition comprises pushing the message from the SINC to one or more memory locations of the one or more processors that are dedicated to the respective user partition.

17. A method according to claim 12, wherein pushing the message from the SINC comprises concurrently pushing both standard integrity messages and high integrity messages from the SINC without prioritization of the high integrity messages.

18. A method according to claim 12, further comprising starting and stopping transmission of messages to the one or more user partitions by issuing a partition level software command to the SINC.

19. A method according to claim 12, further comprising indicating by a user partition that the message pushed to the one or more user partitions is outdated based upon a comparison of a reference time and a timestamp associated with the message.

20. A method according to claim 12, further comprising storing respective messages in a plurality of message queues of the two or more processors, wherein each message queue is associated with a respective user partition.

* * * * *